United States Patent [19]

Takesako

[11] Patent Number: 4,641,239
[45] Date of Patent: Feb. 3, 1987

[54] AUTOMATIC-TRANSFER-TRANSACTION PROCESSING APPARATUS

[75] Inventor: Sumiyoshi Takesako, Yamato, Japan

[73] Assignee: Kabushiki Kaisha Toshiba, Kawasaki, Japan

[21] Appl. No.: 673,088

[22] Filed: Nov. 19, 1984

[30] Foreign Application Priority Data

Nov. 17, 1983 [JP] Japan ................... 58-216714

[51] Int. Cl.⁴ .................................. G06F 15/30
[52] U.S. Cl. ........................... 364/408; 235/379; 235/380; 235/382
[58] Field of Search ............... 364/408; 235/379, 380, 235/381, 382, 385, 383

[56] References Cited

U.S. PATENT DOCUMENTS

| | | | |
|---|---|---|---|
| 4,001,550 | 1/1977 | Schatz | 235/379 |
| 4,423,287 | 12/1983 | Zeidler | 235/379 X |
| 4,423,316 | 12/1983 | Saro et al. | 235/379 |
| 4,438,326 | 3/1984 | Uchida | 364/408 X |
| 4,449,040 | 5/1984 | Matsuoka et al. | 235/379 X |
| 4,590,365 | 5/1986 | Okada | 235/379 |

FOREIGN PATENT DOCUMENTS

| | | | |
|---|---|---|---|
| 0176476 | 10/1982 | Japan | 364/408 |
| 0176475 | 10/1982 | Japan | 364/408 |
| 0035667 | 3/1983 | Japan | 364/408 |
| 0035666 | 3/1983 | Japan | 364/408 |
| 0153265 | 9/1984 | Japan | 364/408 |
| 83-3018 | 9/1983 | PCT Int'l Appl. | 364/408 |

*Primary Examiner*—Jerry Smith
*Assistant Examiner*—Charles B. Meyer
*Attorney, Agent, or Firm*—Cushman, Darby & Cushman

[57] ABSTRACT

An automatic-transfer-transaction processing apparatus comprises a first means for receiving a transfer card of a paper with a magnetic strip and for reading the destination bank from the magnetic strip, and a second means for processing data to transfer a specified amount to the destination bank read from the transfer card. The valid period of the transfer card and the number of times the card has been used are recorded on the magnetic strip. The apparatus further comprises a third means for providing data showing the data, a fourth means for comparing the data with the expiration date of the valid period and comparing the number of times used with a predetermined value, thereby determining whether or not a new transfer card must be issued to replace the old one, and a fifth means for withdrawing the old card and issuing a new transfer card in accordance with the decision made by the fourth means.

10 Claims, 23 Drawing Figures

F I G. 1
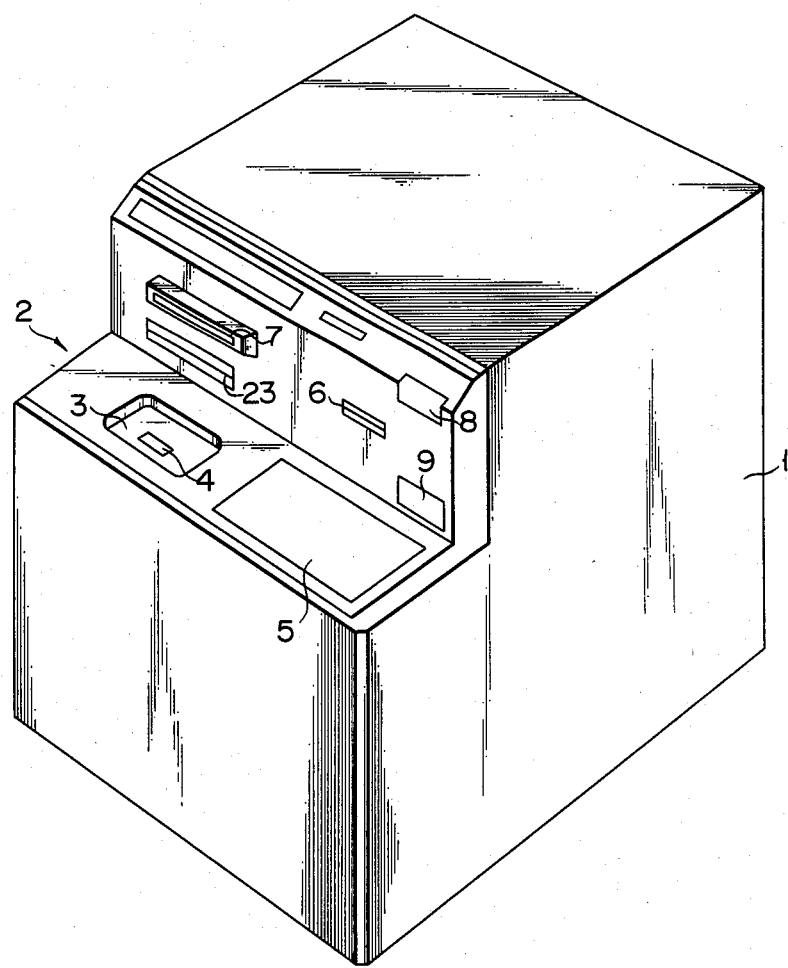

FIG. 3

TRANSFER CARD

| | | FINANCIAL INSTITUTION | | BRANCH | |
|---|---|---|---|---|---|
| TRANS-DESTI-FEREE NATION | | x x x x BANK | | x x BRANCH | |
| | ITEM | ACCOUNT NO. | | NAME | |
| | 1 | x x x x x x | | x x x x x x | |
| TRANSFERER | NAME | | | | TELEPHONE NO. |
| | x x x x x x | | | | |
| | BANK CODE | BRANCH CODE | ACCOUNT NO. | | |
| | x x x x | x x x x | x x x x x x | | |
| NOTE | | | | | |

TOSHIBA BANK

FIG. 4

TRANSFER CARD

| | FINANCIAL INSTITUTION | | BRANCH | |
|---|---|---|---|---|
| TRANS-DESTI-NATION | x x x x BANK | | x x BRANCH | |
| | ITEM | ACCOUNT NO. | NAME | |
| TRANSFEREE | 1 | x x x x x x | x x x x x x | |
| | BANK CODE | BRANCH CODE | ACCOUNT NO. | |
| | x x x x | x | | |
| | NAME | | TELEPHONE NO. | |
| | x x x x x | | x x x - x x x x | |
| NOTE | | | | |

TOSHIBA BANK

FIG. 5

| |
|---|
| START CODE |
| INSTITUTION CODE |
| INITIAL OF FINANCIAL INSTITUTION NAME |
| FINANCIAL INSTITUTION CODE |
| INITIAL OF BRANCH NAME |
| BRANCH CODE |
| ITEM CODE |
| ACCOUNT NUMBER |
| TRANSFEREE'S NAME |
| TRANSFERER'S NAME |
| TELEPHONE NUMBER |
| VALID PERIOD |
| NUMBER OF USES |
| END CODE |
| BCC |

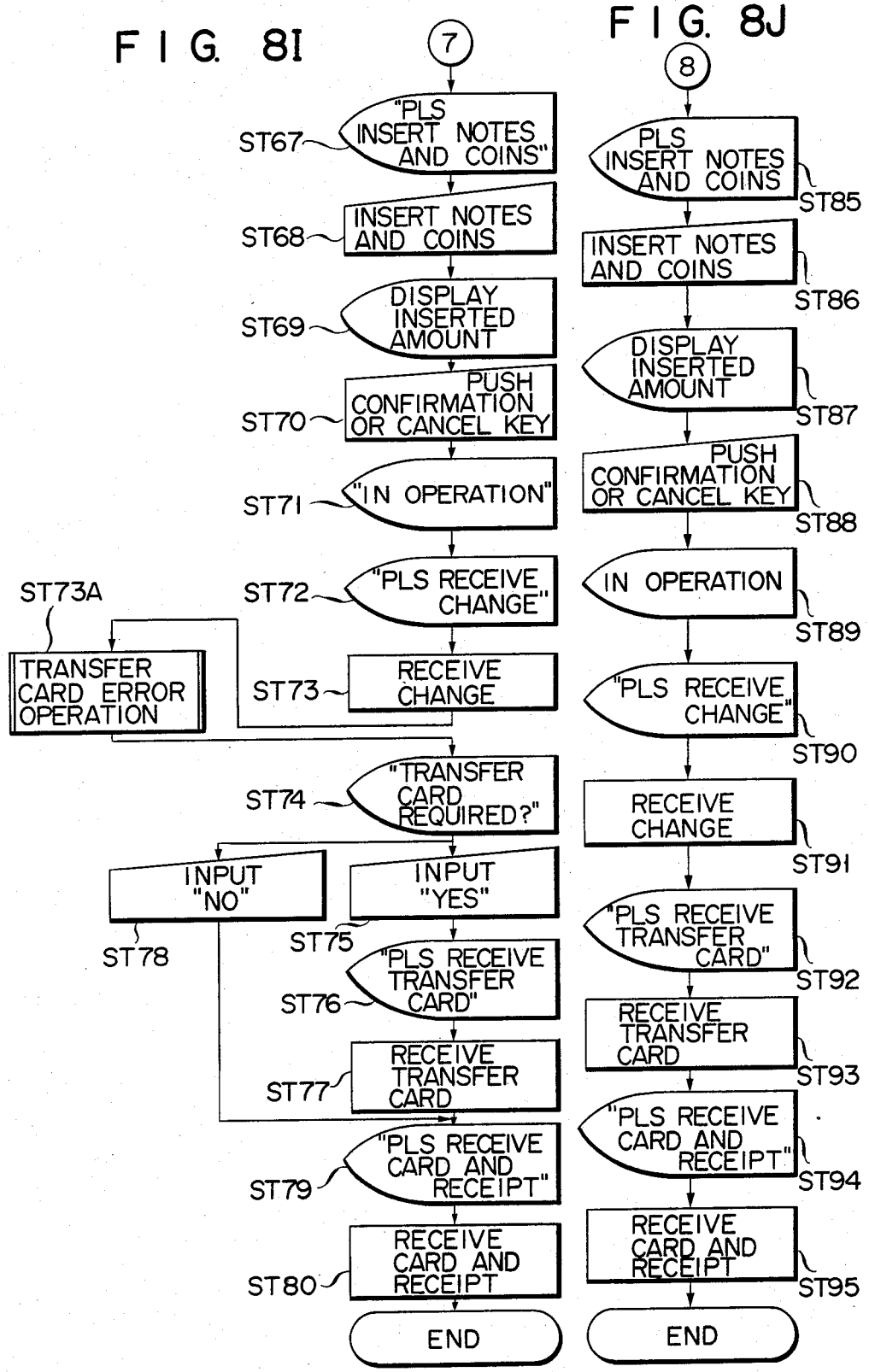

F I G. 13

CONTENTS OF YOUR ID CARD

TOSHIBA BANK KAWASAKI BRANCH
ACCOUNT NO. 123-456

BALANCE    23,567 YEN

TRANSFER FEE : TOSHIBA BANK   200 YEN
               OTHER BANK     400 YEN

TRANSFER CASH
AND TRANSFER FROM
ACCOUNT

PARTIAL OK

TRANSFER
FROM ACCOUNT

OK

F I G. 14

TRANSFER CARD

VALID PERIOD EXPIRED AND CARD WITHDRAWN

| | | FINANCIAL INSTITUTION | | BRANCH | |
|---|---|---|---|---|---|
| TRANS-<br>FEREE | | x x x x | BANK | x x | BRANCH |
| DESTI-<br>NATION | ITEM | ACCOUNT NO. | | NAME | |
| | 1 | x x x x x x | | x x x x x | |
| TRANSFERER | | NAME | | TELEPHONE NO. | |
| | | x x x x x | | | |
| | BANK<br>CODE | BRANCH<br>CODE | ACCOUNT NO. | | |
| | x x x x | x x x x | x x x x x x | | |
| NOTE | | | | | |

TOSHIBA BANK

AUTOMATIC-TRANSFER-TRANSACTION PROCESSING APPARATUS

BACKGROUND OF THE INVENTION

The present invention relates to an automatic-transfer-transaction processing apparatus which may be installed in a bank and which may be easily operated by anyone to transfer money to the account of any person.

Recently, apparatuses for automatically processing transfer transactions have been developed to meet the demand that bank transactions be done automatically. An apparatus of this type exchanges data with a host computer, when operated, to transfer a specified amount to be transferred to the account of any person. The user must input various pieces of data, e.g., the amount he wishes to transfer, the transferee's acount number, etc. Whenever he wants to withdraw money and transfer it, he needs to input the number of his account, too. Unless he is good at operating keys, he must spend a long time entering the necessary items of data, or he may input wrong data.

The user may need to transfer money to the same person's account many times. To save time, he can use a transfer card on which the data to be input to the apparatus is recorded. The card is made of paper and has a magnetic strip. The information is magnetically recorded on the strip and is also printed on the card so that the user may read it. When the user inserts the transfer card in the apparatus, the data is read from it. In accordance with the information thus read out, a transfer is processed. Since the card is inexpensive and data may easily be printed on it, it is made of paper. However, it may deteriorate with long use, and the magnetic strip may become less reliable. If this is the case, the card can no longer be used. Hence, it is necessary to limit the valid period of the card or the number of times the card may be used. But there is no way to prevent the user from using the card whose valid period has expired or which has been used over a prescribed number of times.

SUMMARY OF THE IVNENTION

The object of this invention is to provide an automatic-transfer-transaction processing apparatus which processes a transfer transaction in accordance with data read from a transfer card inserted in it, which checks the use-limit of the card, and which issues a new transfer card to replace the inserted card which has expired the use-limit.

This object may be achieved by an automatic-transfer-transaction processing apparatus which comprises a first means for receiving a transfer card on which at least the transferee and the use-limit data of the card are printed and from which these pieces of data can be read by a device, and for reading these pieces of data, second means for transferring a specified amount to the transferee which has been read from the magnetic strip, third means for determining, from the use-limit data, whether or not a new transfer card must be issued, and fourth means for issuing a new card in accordance with the decision made by the third means.

BRIEF DESCRIPTION OF THE DRAWINGS

Other objects and features of the present invention will be apparent from the following description with the accompanying drawings, in which:

FIG. 1 is a perspective view of an automatic transfer-transaction-processing apparatus according to this invention;

FIG. 3 is a plan view of transfer card with pieces of data printed on it;

FIG. 4 is a plan view of transfer card with pieces of data printed on it;

FIG. 5 shows the format of data recorded on the magnetic strips of the cards shown in FIGS. 4 and 5;

FIGS. 8A through 8J are flow charts explaining the operation of the apparatus shown in FIG. 1;

FIG. 13 shows the data displayed by the CRT display unit when money is transferred from a transfer card; and FIG. 14 is a plan view of a transfer card which has been withdrawn in the process shown in FIG. 12.

DETAILED DESCRIPTION OF THE PREFERRED EMBODIMENT

FIG. 1 shows an automatic teller machine, i.e., one embodiment of the present invention. The machine has a housing 1. An operating section 2 is provided at the front side of this housing 1. The section 2 has a horizontal panel and a vertical panel.

Figure 2:
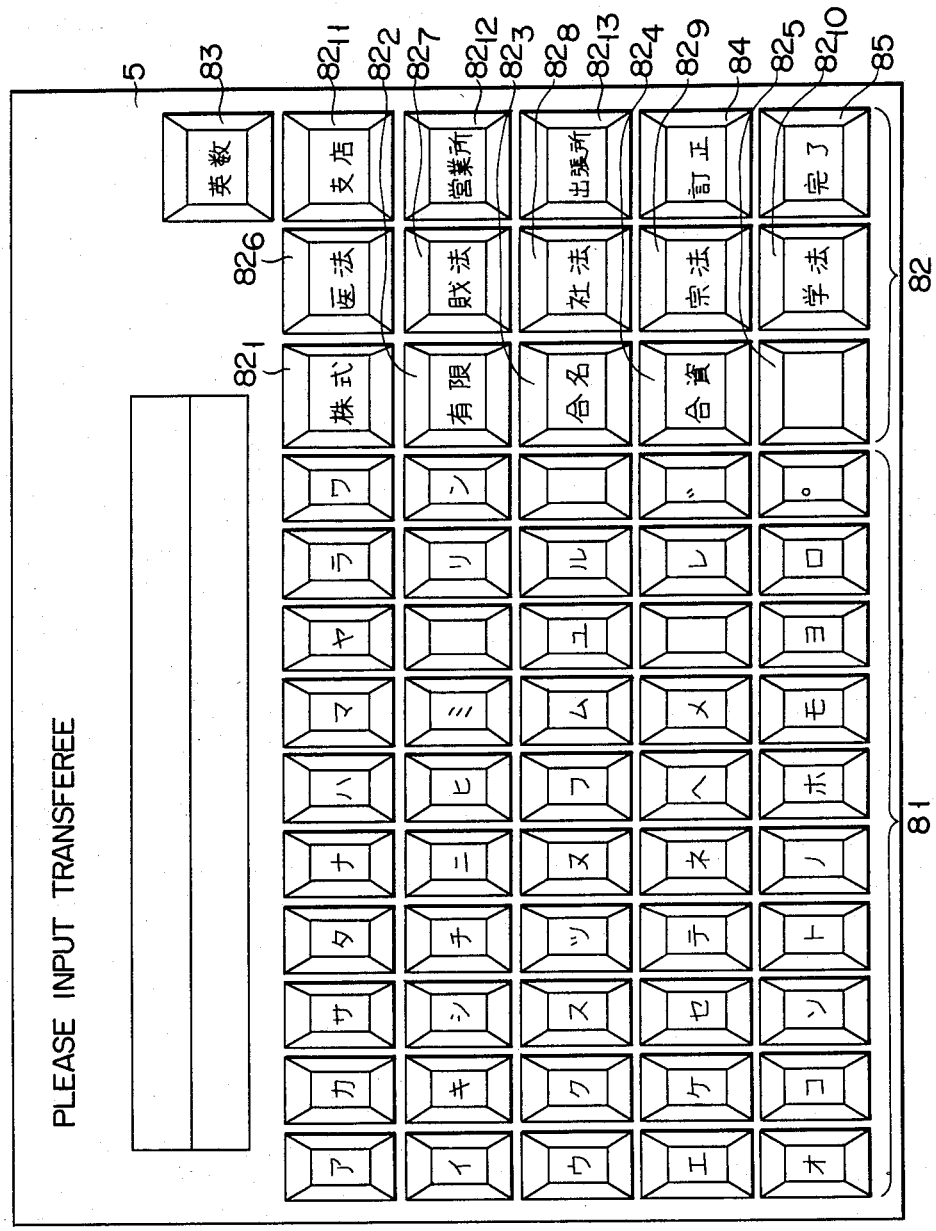
FIG. 2 is a plan view of the CRT display unit of the apparatus of FIG. 1.

The horizontal panel of the section 2 has a bank note port 3 through which notes to be transferred may be inserted or through which change may be dispensed. A door 4 is provided to open and close this port 3. A color CRT display unit 5 is provided on the horizontal panel to display illustrations, characters or messages for instructing a customer to input necessary data. When the customer touches any portion of the CRT screen where a piece of data, e.g., a keycode, an amount, an account number, or "approval," "confirmation" or "cancellation" of transfer, is displayed, a touch sensor detects this touching and generates key input signals. These signals are supplied to a main control section 11. As shown in FIG. 2, the CRT display unit 5 displays the message "PLS INPUT TRANSFEREE," the katakana keys 81 for entering the transferer's and transferee's name, the keys $82_1$ to $82_{13}$ for entering the type of transferee such as a corporation, the alphanumeric character-selecting key 83, the correction key 84, and the end key 85. The keys $82_1$, $82_2$, $82_3$ and $82_4$ represent a limited company, a limited responsibility company, an unlimited partnership and a limited partnership, respectively. The keys $82_6$, $82_7$, $82_8$, $82_9$ and $82_{10}$ represent a medical corporation, a foundation, a business corporation, a religious institution and an educational institution. The keys $82_{11}$, $82_{12}$ and $82_{13}$ represent a branch office, a district office and a field office. Whenever the operation step changes to another step, the display on the CRT screen is changed.

The vertical panel of the operation section 2 has a card port 6, a passbook/card port 7, a coin-inserting port 8, a coin-dispensing port 9 and a receipt port 23. An ID card with account information (e.g., a keycode and an account number) recorded on it may be inserted into the machine through the port 6 and may be discharged through this port 6. A passbook or a transfer card 10 (FIG. 6) may be inserted into the machine via the port 7 and discharged through the port 7.

As shown in FIGS. 3 and 4, destination information, i.e., the name and branch name of the financial institution holding the transferee's account, and transferee information, i.e., the item number, account number and account name of the transferee, are printed on the surfaces 31 of the transfer card 10. In addition to these pieces of inforamtion, the transferer information, i.e., the name and account number of the transferer, the bank code and the branch code, are printed on the card 10 shown in FIG. 3, and the transferer information, i.e., the name and telephone number of the transferer, are printed on the card shown in FIG. 4.

As shown in FIGS. 3 and 4, the transfer cards 10 have each magnetic strip 32 extending along the under side. Transfer information is recorded on this magnetic strip 32. As illustrated in FIG. 5, this information includes a start code, a code showing the type of the financial institution with the transferee's account, the initial of this institution, the intial of the branch of the institution to which money will be transferred, the branch code specifying the branch, the item code specifying the transferee's account type, the transferee's account number, the transferee's and the transferer's names, the transferee's and transferer's telephone numbers, the valid period of the card, the number of uses, an end code, and a binary check code (BCC) for parity check.

Figure 6:
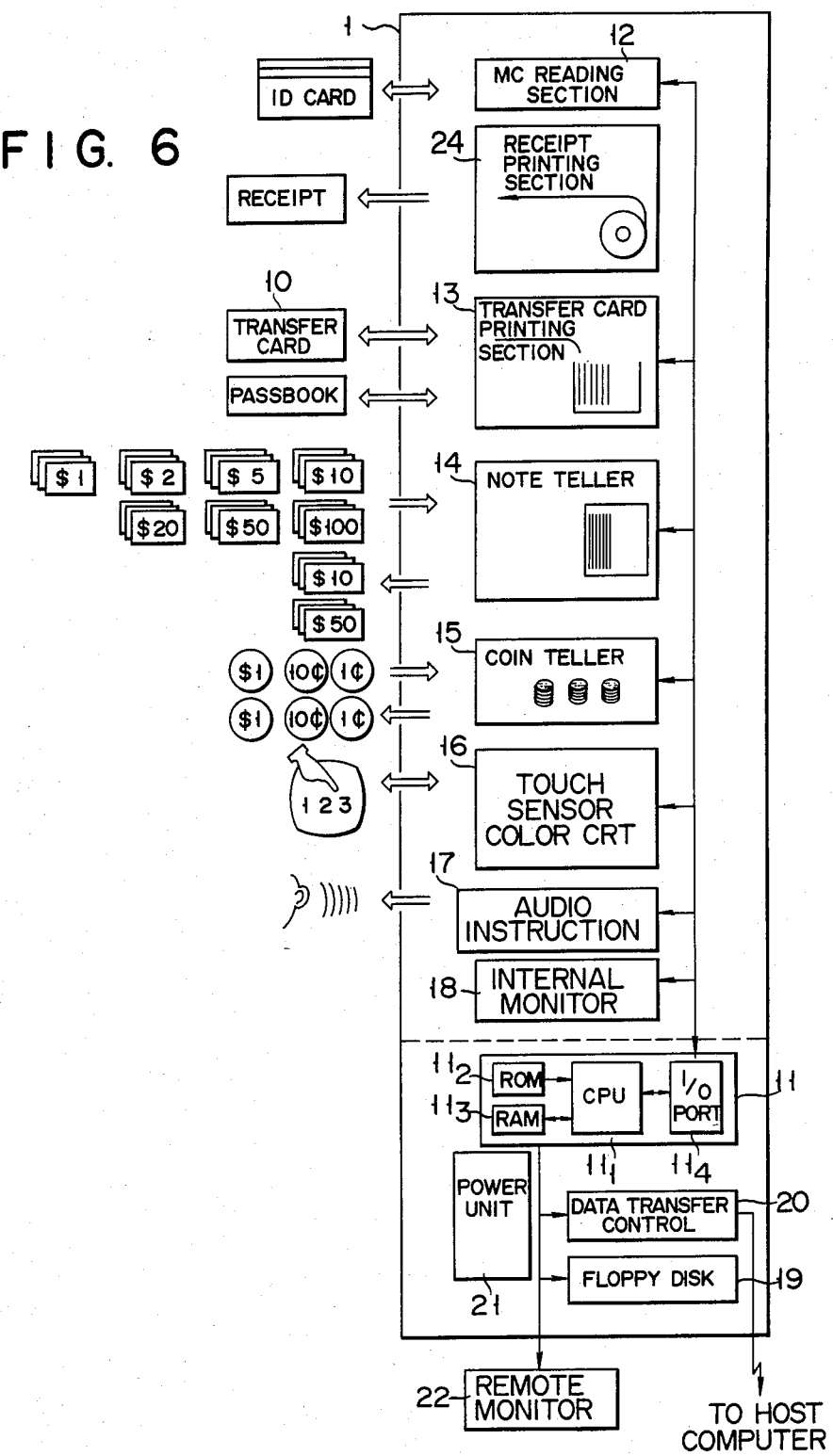
FIG. 6 is a block diagram of the apparatus shown in FIG. 1.

As illustrated in FIG. 6, the main control section 11 is provided within the housing 1 to control the operation of the automatic teller machine. Also provided within the housing 1 are an MC reading section 12, a printing/reading section 13, a receipt printing section 24, a note teller 14, a coin teller 15, a touch sensor color CRT 16, an audio instruction unit 17, a personnel internal monitor 18, a floppy disk 19, a data transfer control 20, and a power unit 21. The MC reading section 12 receives an ID magnetic card (MC) inserted through the card port 6 and reads the account information from the card. The printing/reading section 13 reads information from the magnetic strip of a passbook inserted through the passbook/card port 7, then prints the pieces of transaction information on the passbook and journal paper, and dispenses the passbook. It may read information from the magnetic strip 32 of a transfer card 10 inserted through the port 7. The receipt printing section 24 prints the transaction information on a piece of paper (i.e., receipt) and issues the receipt through the receipt port 23. The note teller 14 receives bank notes inserted through the bank note port 3 or dispenses bank notes of a specified amount through the port 3. The coin teller 15 receives coins inserted through the coin-inserting port 8 and dispenses coins of a specified amount through the coin-dispensing port 9. The touch sensor color CRT 16 is a part of the CRT display unit 5. The audio instruction unit 17 has a speaker (not shown) for sounding a message, thus telling the customer how to operate the machine. The floppy disk 19 is used to store transaction data. The data transfer control 20 controls the data transferred between the main control section 11 and a host computer (not shown).

As shown in FIG. 6, the main control section 11 is a one-chip microcomputer comprising a central processing unit (CPU) $11_1$, a read-only memory (ROM) $11_2$ for storing a control program equivalent to the flow charts of FIGS. 8A to 8J, a random-access memory (RAM) $11_3$ used as a work area for arithmetic operations on data, and an I/O port $11_4$ for controlling the input/output of data with the units forming the automatic teller machine. The one-chip may be i8086 made by Intel Corp., U.S.A. An external remote monitor 22 for personal use of the machine is connected to the main control section 11.

Figure 7:
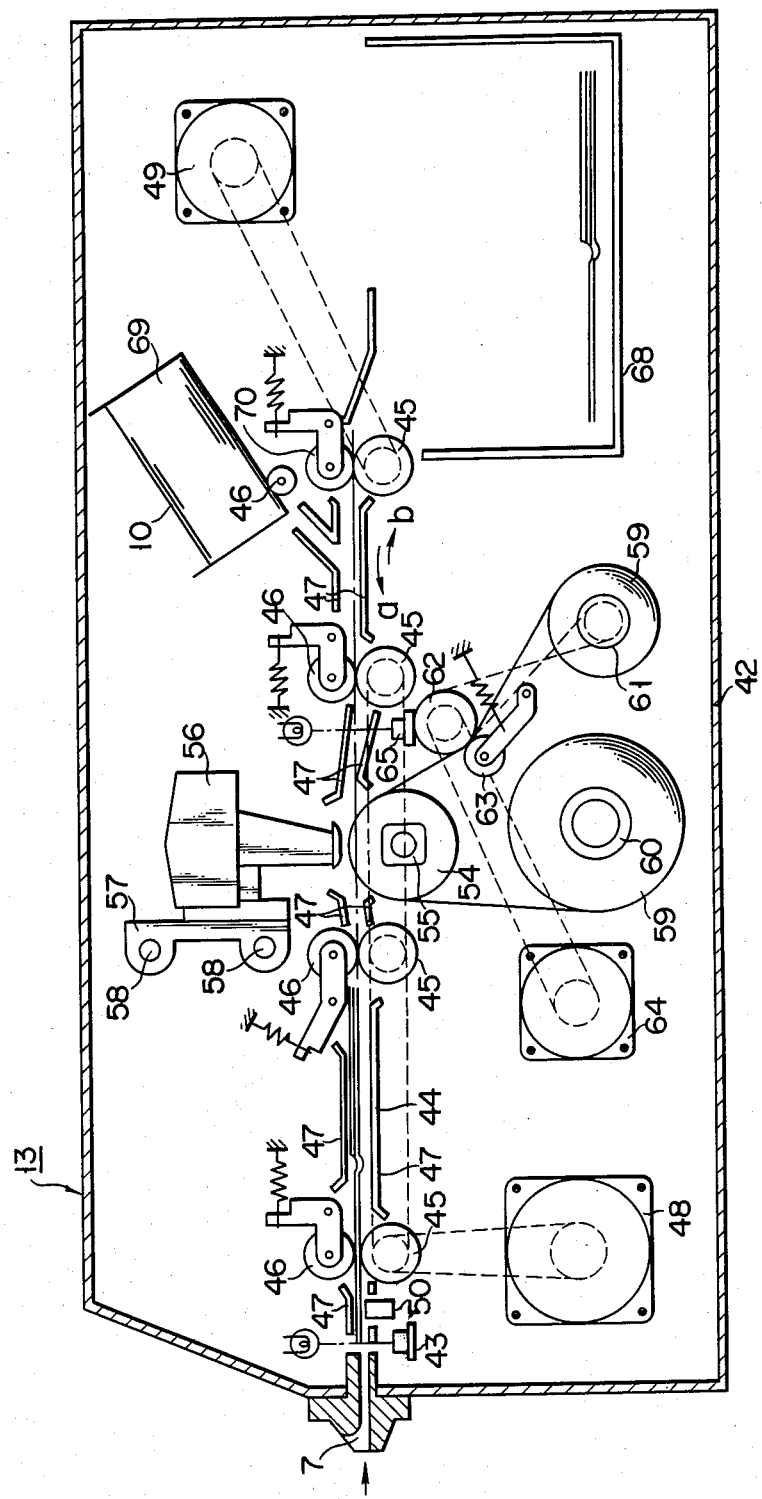
FIG. 7 is a sectional view of the card printing section shown in FIG. 6.

The printing/reading section 13 has a structure as shown in FIG. 7. As shown in this figure, the section 13 comprises a case 42 which has a hole cut in the front wall. This hole is continuous to the passbook/card port 7. A photodetector 43 is arranged near the port 7 to optically read the passbook or transfer card 10 inserted through this port. A path 44 extends from the photodetector 43 to the rear portion of the case 42 in the horizontal direction. It comprises drive rollers 45, pinch rollers 46 put in rolling contact with the drive rollers 45, and guide members 47. The drive rollers 45 are all driven by a pulse motor 48 through belts, except for the roller 45 located at the trailing end of the path 44, which is driven by another pulse motor 49. A magnetic head 50, i.e., a MC reader, is arranged at the leading end of the path 44. The head 50 is brought into contact with the magnetic strip of the passbook or transfer card 10 to read information from, or write it on, the strip which extends at right angles to the direction in which the passbook or card 10 is conveyed.

A platen 54 is rotatably supported midway along the path 44. An electromagnetic brake 55, which functions as a lock mechanism, is coupled to the platen 54. The platen 54 is locked by the brake 55 while information is being read from, or written on, the passbook or transfer card 10. It is rotated while data is being printed on journal paper 59. A print head 56 is held by a carriage 57 which is guided by a rod 58 and may move along the platen 54. The platen 54 and print head 56 constitute a printing unit 76 for printing information on the passbook, the transfer card 10 or the journal paper 59. The paper 59 is wound around a supply reel 60 and taken up by a take-up reel 61 after being wrapped around the platen 54. Paper 59 is fed as a supply roller 62 and a pinch roller 63 pinch it and rotate. The reel 61 and roller 62 are driven by a pulse motor 64 through belts. A photodetector 65 is provided in front of the platen 54, across the path 44, to optically read the passbook or card 10. A box 68 is arranged near the trailing end of the path 44 to store the passbooks conveyed to it.

A transfer card storage section 69 is located near the trailing end of the path 44 to store new transfer cards 10 on which no transfer information is printed or recorded. The new cards 10 are picked up by a pick-up roller 70, one by one, and are supplied to the path 44.

It will now be described how the machine processes a transfer transaction, with reference to FIGS. 8A to 8J and FIGS. 9 to 12. The CRT display unit 5 displays the message, "PLEASE SELECT TRANSACTIONS," and keys for "WITHDRAWAL," "DEPOSIT," "BALANCE ENQUIRY," "PASSBOOK WRITING" and "TRANSFER" (ST1). Let us assume that a customer touches the "TRANSFER" key (ST2). The main control section 11 then causes the CRT display unit 5 to display the message "PLEASE SELECT CASH OR CARD" and keys for "CASH" and "CARD" (ST3). When he touches the "CARD" key in step ST4, the main control section 11 detects that money must be transferred, using an ID card; it causes the CRT display unit 5 to display the message, "PLEASE INPUT CARD" (ST5). Accordingly, the customer inserts his ID card through the card port 6 (ST6). The ID card is fed to the MC reading section 12. A magnetic head (not shown) reads the account information, e.g., a keycode and an account number, from the magnetic strip 32 of the ID card. The account information is checked by the main control section 11.

When the section 11 finds the ID card a wrong one, it performs error processing. When the section 11 finds the ID card a correct one, it causes the CRT display unit 5 to display the message, "PLEASE INPUT KEYCODE," the ten keys, and the correction key 84 (ST7). The customer thus enters his key code (ST8). The main control section 11 then determines whether or not the keycode is identical with the registered keycode (ST201). When the input keycode is not identical with the registered one, the section 11 instructs the customer to input the keycode again (ST202). When the input keycode is identical with the registered one, the section 11 causes the CRT display unit 5 to display the message, "IN OPERATION, PLEASE WAIT" (ST203). At the same time, the section 11 transmits the data recorded on the ID card to the host computer (not shown). The host computer transmits the data representing the balance of the customer's account to the main control section 11. The section 11 causes the unit 5 to display the data shown in FIG. 13, i.e., the account information including the balance and the transfer fee, and two keys for "TRANSFER CASH AND TRANSFER FROM ACCOUNT—PARTIAL OK" and "TRANSFER FROM ACCOUNT—OK" (ST204). When the balance is equal to or greater than the amount to transfer, the customer touches the "OK" key. When the balance is less than the amount to transfer, he touches the "PARTIAL OK" key (ST205). Suppose the customer touches the "PARTIAL OK" key. In this case, the main control section 11 detects this (ST206). It causes the CRT display unit 5 to display a message, "PLS INPUT AMOUNT AND CASH AMOUNT" (ST207). Accordingly, the customer inputs the amount to be transferred and the cash amount (ST208). The section 11 determines whether or not the amount to be transferred is less than the sum of the amount of the cash and the balance (ST209). If the answer is "yes," the operation goes to step ST11 so the amount may be transferred.

On the other hand, when the customer touches the "OK" key in step ST205, the section 11 detects this fact (ST 206). It then causes the CRT display unit 5 to display a message, "PLS INPUT AMOUNT" (ST210). Hence, the customer inputs the amount to transfer (ST211). The section 11 judges whether or not this amount is less than the balance (ST212). If the answer to this question is "yes," the operation advances to step ST11.

When the answer to the question imposed in step ST209 or ST212 is "no," the main control section 11 judges that no transfer can be achieved, and thus performs a selection disable operation (ST213).

In step ST11, the main control section 11 causes the CRT display unit 5 to display a message, "PLS SELECT KEY OR CARD OPERATION," a "REGISTRATION" key and a "DESIGNATION" key for designating a transfer card. The "DESIGNATION" key is touched to enter new transfer data, e.g., the name of a financial institution and an account number. The "REGISTRATION" key is touched to retrieve the registered transfer information.

When the customer touches the "DESIGNATION" key in step ST12, the section 11 detects this fact and causes the unit 5 to display a message, "PLS INPUT BANK NAME," and the katakana keys 51 (ST13). The customer touches the keys 51 to enter the desired bank (ST14).

The main control section 11 checks a list of the branches of the specified bank and causes the CRT display unit 5 to display a message, "PLS INPUT BRANCH NAME," and the katakana keys 51 (ST15). The customer touches the keys 51, thereby entering the name of the desired branch (ST16). The section 11 causes the CRT display unit 5 to display a message, "PLS INPUT ITEM AND ACCOUNT NUMBER," the ten keys, the correction key 84, a saving account key, and an account-checking key (ST17). The customer therefore touches the ten keys, thereby entering the account number and the item of transaction (ST18). When the section 11 detects that the these pieces of information have been entered and that the desired branch is not the main office of the bank, it causes the unit 5 to display a message, "PLS INPUT TRANSFEREE," the katakana keys 51, the correction keys 84 and the end key 85 (ST19). When the customer touches the end key 85 in step ST20, the section 11 causes the CRT display unit 5 to display a message, "IN OPERATION" (ST21). The section 11 exchanges information with the host computer and causes the printing unit 76 to print the information on the journal paper 59. It causes the unit 5 to display a message, "PLS CONFIRM," the transfer information, a confirmation key and a cancellation key (ST22). Accordingly, the customer touches the confirmation key if the transfer information is correct, or he touches the cancellation key if the information is not correct (ST23).

When the customer touches the cancellation key step ST23, the section 11 detects this and starts a cancelling process. On the other hand, when he touches the confirmation key in step ST23, the section 11 detects this fact and causes the CRT display unit 5 to display a message, "IN OPERATION" (ST24). In this case, the main control section 11 receives electronic funds-transfer (EFT) information and causes the printing unit 76 to print it on the journal paper 59. The section 11 performs a transfer card error operation (described later) in step ST24A. In step ST25, it causes the unit 5 to display a message, "TRANSFER CARD REQUIRED?," a "YES" key and a "NO" key. When the customer touches the "YES" key in step ST26, the section 11 causes the printing/reading section 13 to print the name of the specified financial institution, the name of the branch, the account number, the item number, the transferee's name, the transferee's acount information, the transferer's name, and the transferer's account information. These pieces of data are recorded on the magnetic strip 32 of the transfer card 10. The card 10 shown in FIG. 3 or 4 is dispensed from the passbook/card port 7.

The pick-up roller 70 takes a new transfer card 10 from the storage section 69. This card 10 is conveyed through the path 44 in the direction of arrow a (FIG. 7). When the trailing edge of the card 10 opposes the print head 56, it is moved in the opposite direction of arrow b until the leading edge of the card 10 reaches the print head 56. The print head 56 prints the transfer information on the upper surface 31 of the card 10. Upon completion of the printing, the new transfer card 10 is conveyed through the path 44 in the direction of arrow a. The magnetic head 50 records the transfer information on the magnetic strip 32 of the card 10 when strip 32 reaches the magnetic head 50. Thereafter, the new transfer card 10 is issued through the passbook/card port 7. In this case, the section 11 causes the unit 5 to display a message, "PLS RECEIVE TRANSFER CARD" (ST27). The customer takes the new card 10 (ST28).

When the customer touches the registration key in step ST32, the main control section 11 causes the CRT display unit 5 to display a message, "IN OPERATION" (ST33). The section 11 exchanges information with the host computer and causes the printing unit 76 to print the transfer information on the journal paper 59. It then causes the unit 5 to display a message, "PLS CONFIRM," the transfer data, the confirmation key, and the cancel key (ST34). Suppose the customer touches the confirmation key in step ST35. The section 11 detects this fact and causes the CRT display unit 5 to display a message, "IN OPERATION" (ST36). When the main control section 11 receives the electronic funds transfer information, it causes the printing unit 76 to print this information on the journal paper 59, and it causes the CRT display unit 5 to display a message, "PLS RECEIVE CARD AND RECEIPT" (ST37). The customer takes the transfer card 10 and the receipt (ST38). Thus ends the automatic transfer process.

Figure 8A:
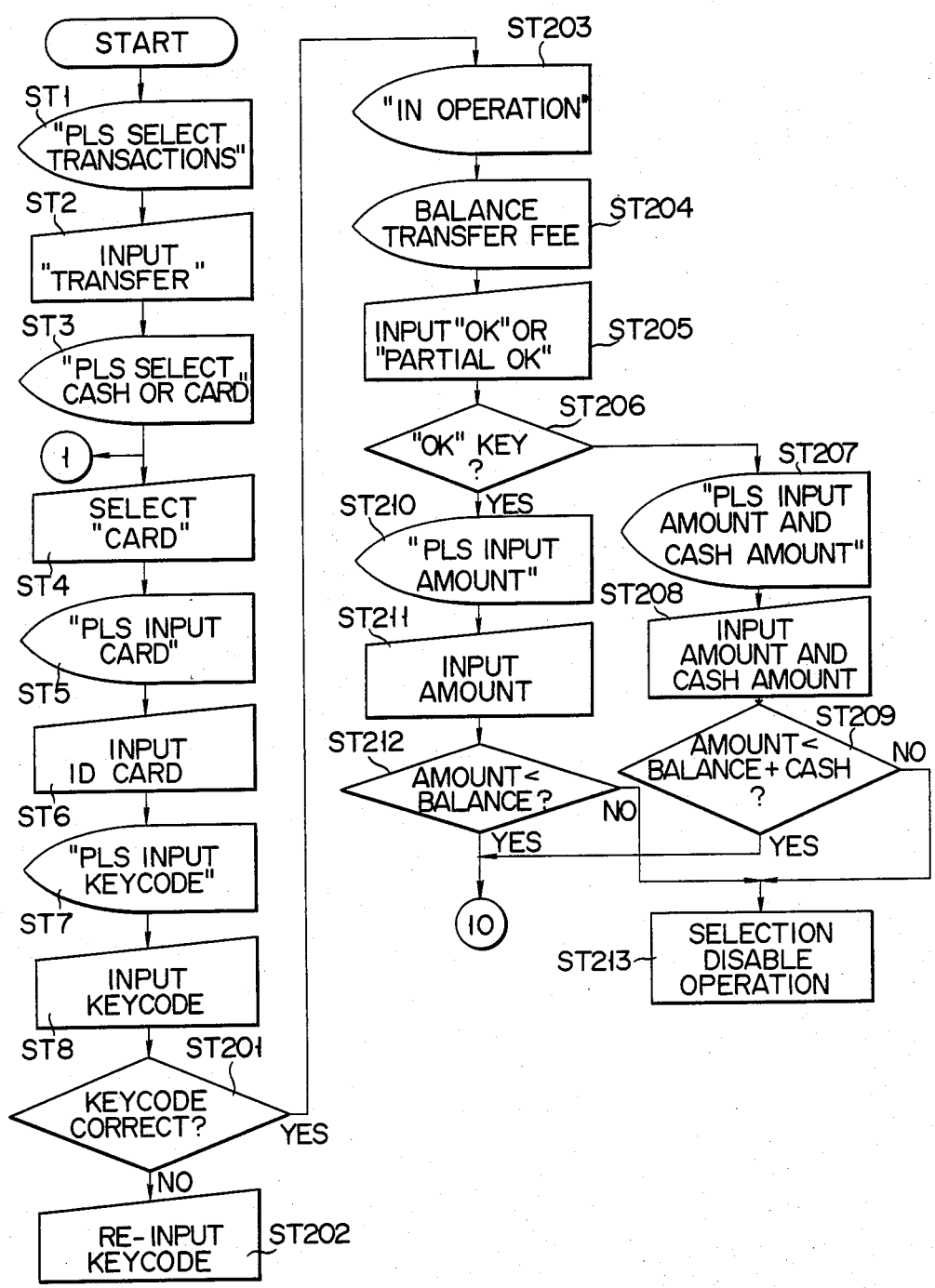
Figure 8B:
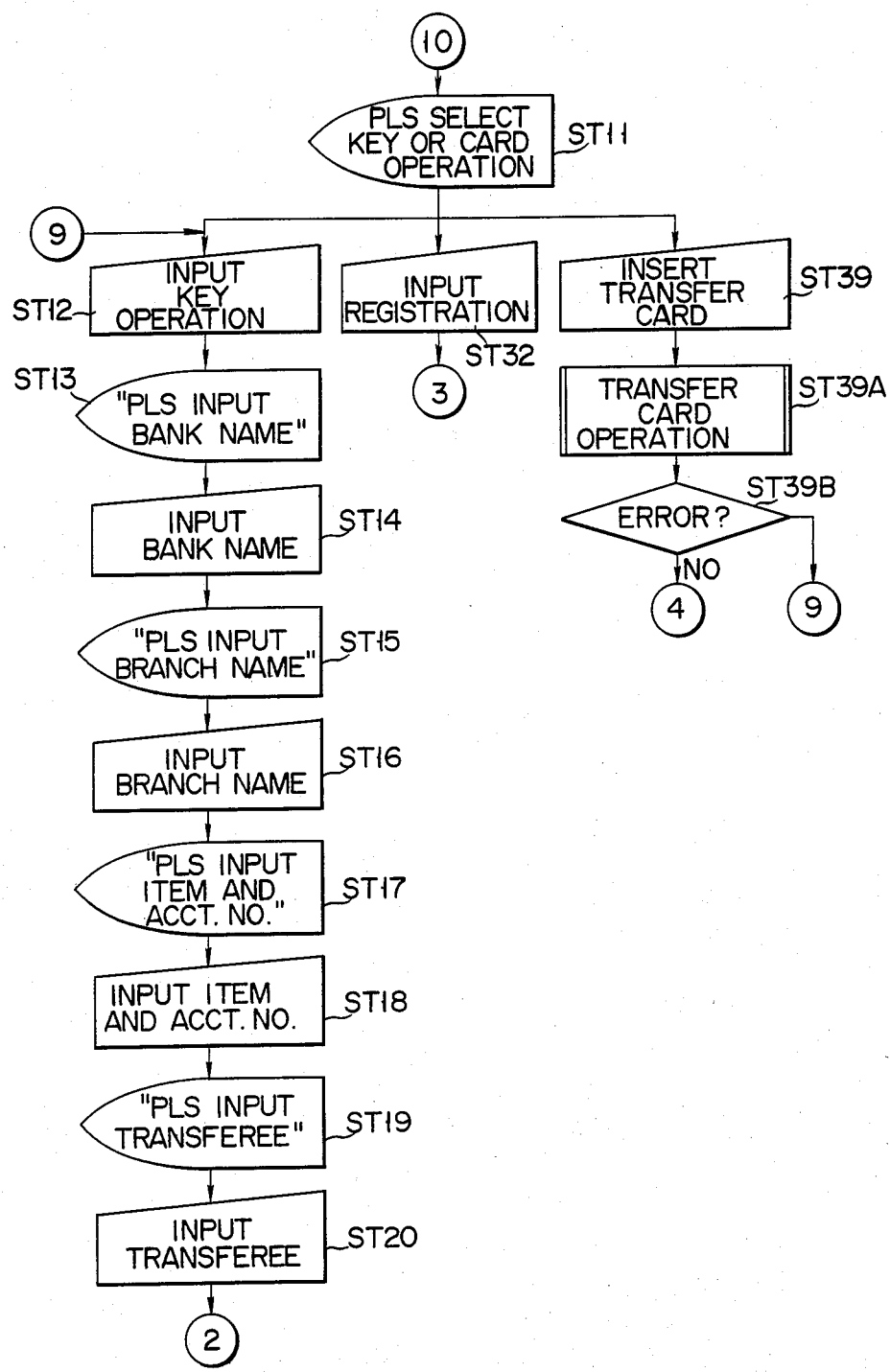
Figure 8C:
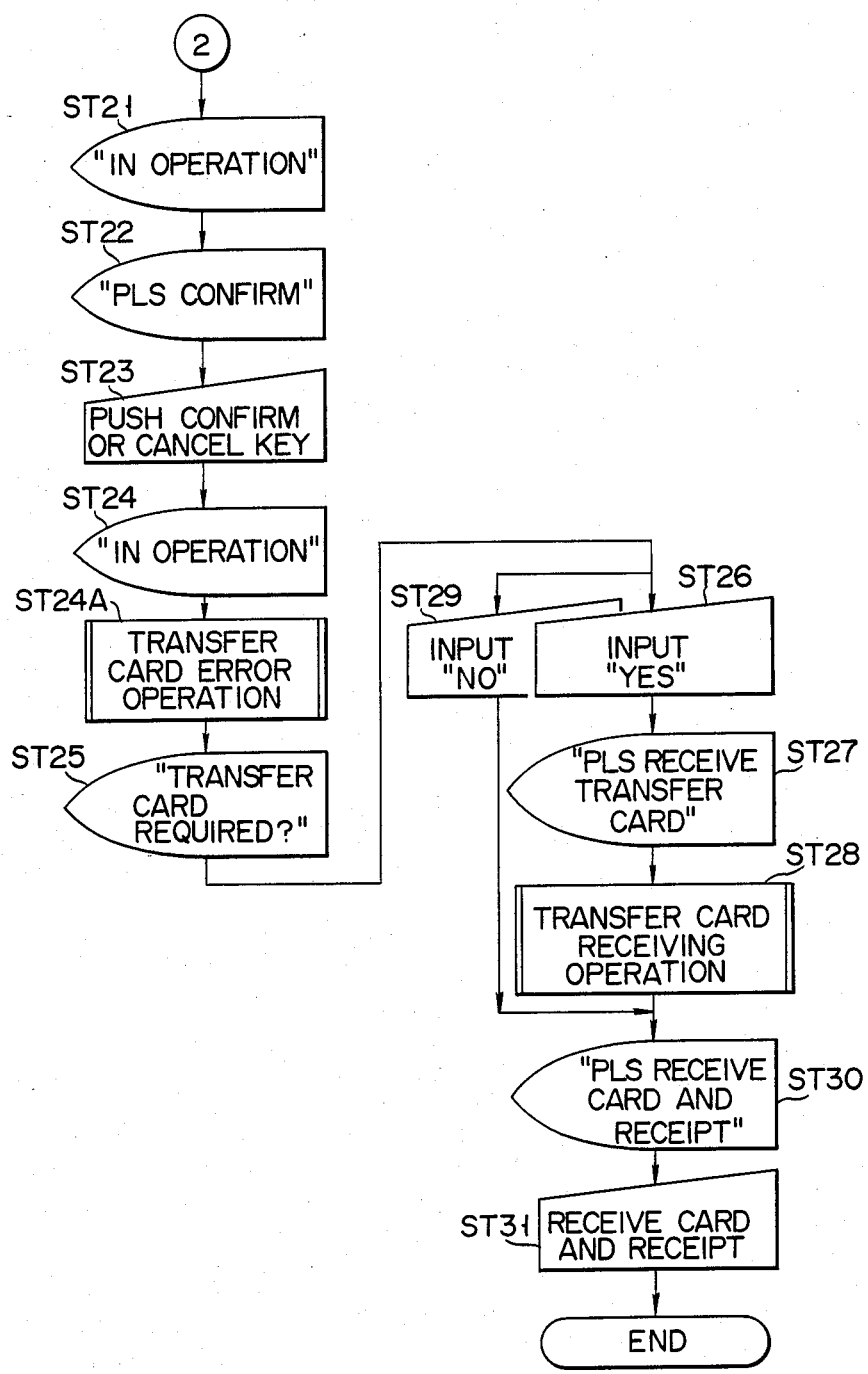
Figure 8D:
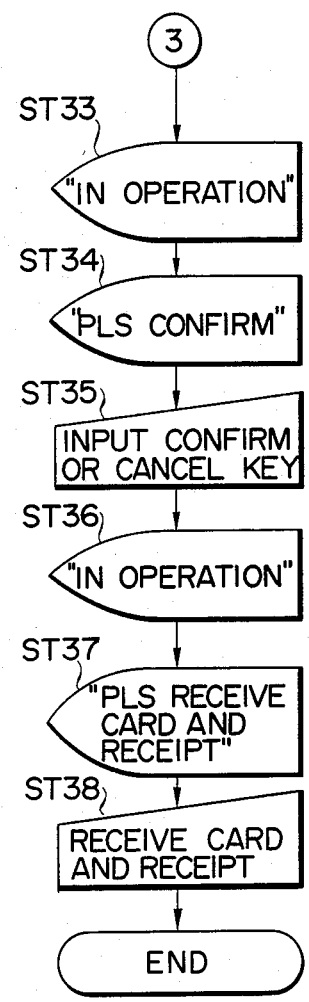
Figure 8E:
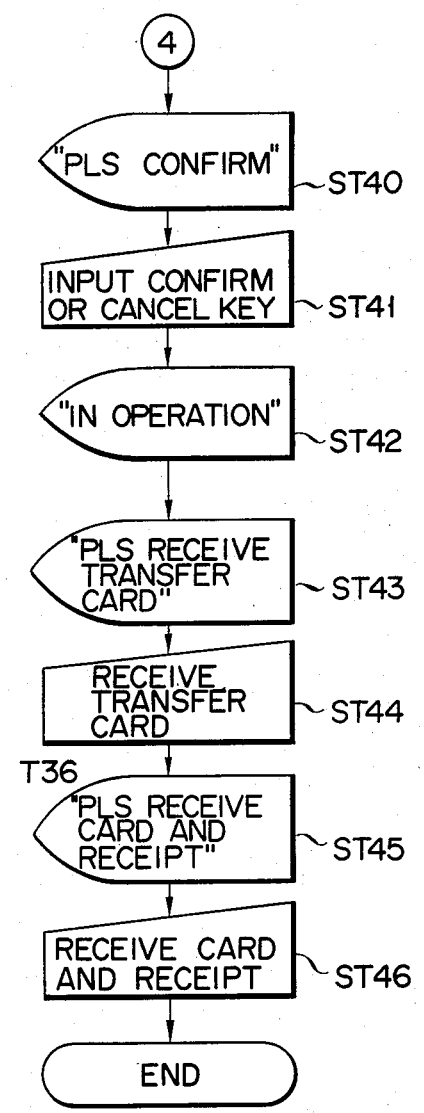
Figure 8F:
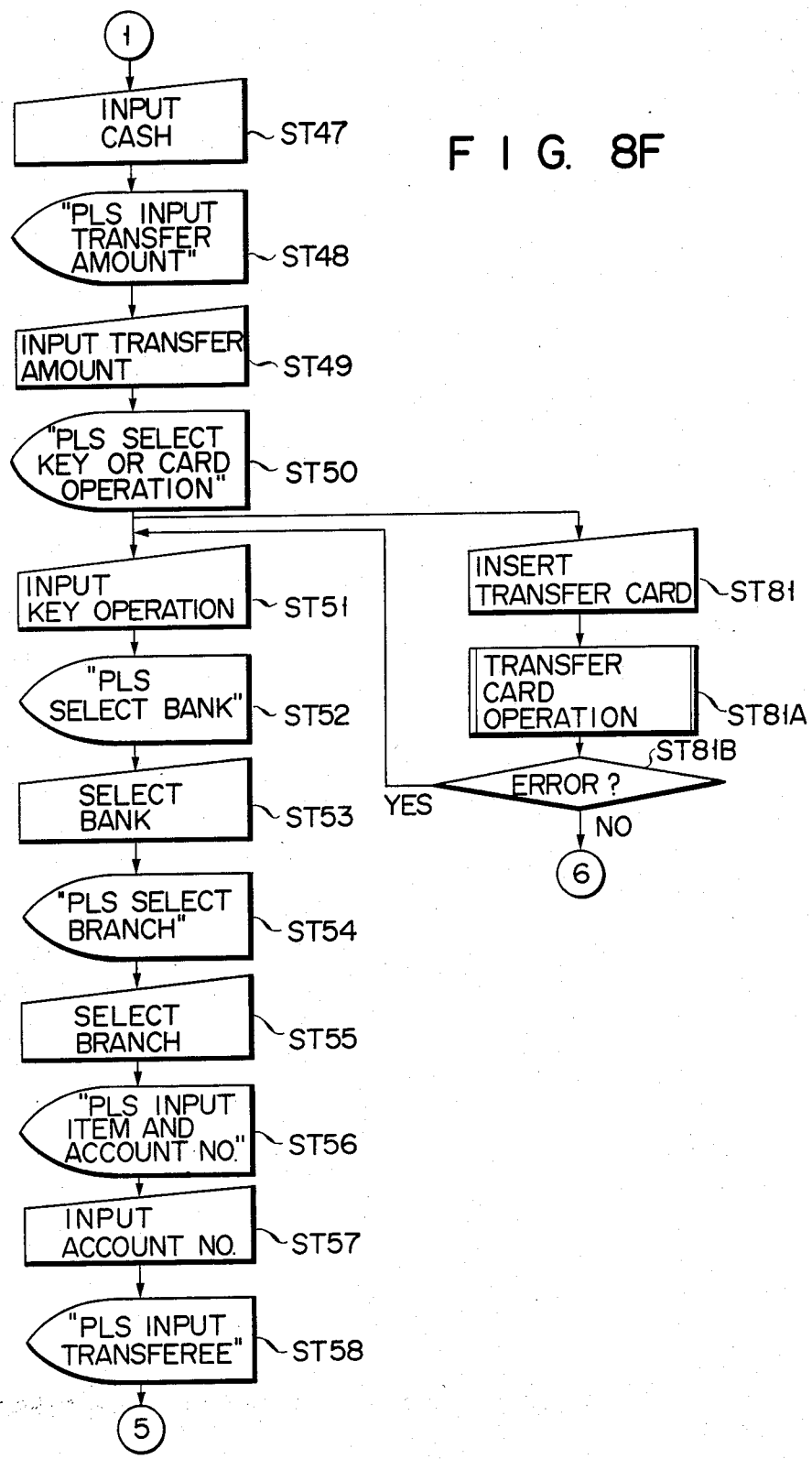
Figure 8G:
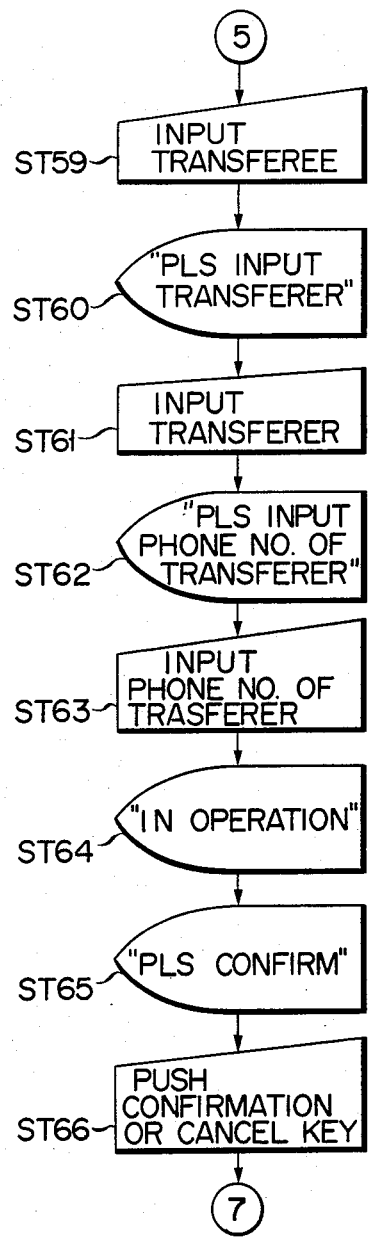
Figure 8H:
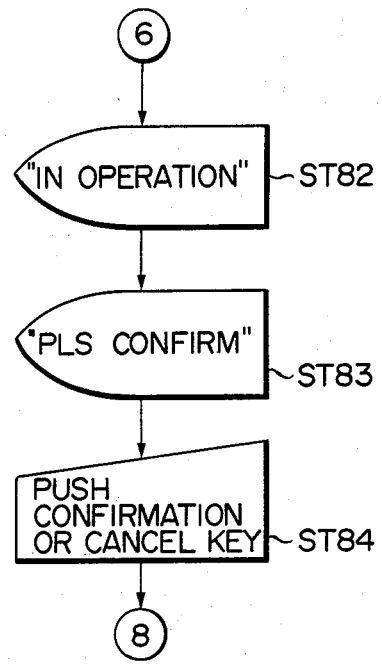

Suppose the customer selects the card operation in step ST11 and inserts the transfer card 10 in the port 7 in step ST39. Then, the card 10 is supplied to the printing/reading section 13. If this is the case, the main control section 11 performs a transfer card operation (described later) in step ST39A. In step ST39B, it is determined whether or not the data read from the card 10 has an error. If the answer to this question is "yes," the operation goes to step ST12. If the answer is "no," the section 11 causes the magnetic head 50 to read the information from the magnetic strip 32 of the inserted card 10. The information read from the card 10, i.e., the code showing the type of the financial institution with the transferee's account, the initial of this institution, the initial of the branch of the institution to which money will be transferred, the code for the transferee's account type, the transferee's account number, the transferee's name, the transferer's name, the valid period of the transfer card 10, the number of uses, etc. These pieces of data are supplied to the main control section 11. As shown in FIG. 8E, the section 11 causes the CRT display unit 5 to display a message, "PLS CONFIRM," the transfer information, the confirmation key, and the cancellation key (ST40). The customer touches the confirmation key or the cancellation key (ST41). When he touches the cancellation key, the section 11 detects this and performs the cancellation operation. When he touches the confirmation key, the section 11 detect this fact and causes the unit 5 to display a message, "IN OPERATION" (ST42). When the section 11 receives the electronic funds transfer data, it causes the printing unit 76 of the printing/reading section 13 to print this data on the journal paper 59. At the same time, the transfer card 10 is moved from the section 13 and dispensed from the port 7 under the control of the main control section 11. In this case, the main control section 11 causes the CRT display unit 5 to display a message, "PLS RECEIVE TRANSFER CARD" (ST43). The customer takes the card 10 (ST44). The section 11 causes the unit 5 to display a message, "PLS RECEIVE ID CARD AND RECEIPT" (ST45). The customer takes both the ID card and the receipt (ST46). The automatic transfer transaction process thus ends.

On the other hand, when the customer touches the "CASH" key in step ST3, the main control section 11 detects this (ST47). The section 11 causes the CRT display unit 5 to display a message, "PLS INPUT TRANSFER AMOUNT," the ten keys, and the amount key (ST48). The customer therefore touches the ten keys, thus entering the amount to transfer (ST 49). The section 11 causes the unit 5 to display a message, "PLS SELECT KEY OR CARD OPERATION," and the designation key for "KEY OPERATION" (ST50). Suppose the customer touches the designation key (ST51). The section 11 detects this fact and causes the unit 5 to display a message, "PLS SELECT BANK," and keys for selecting a financial institution (ST52). The customer touches some of these keys, thus entering the name of the desired bank (ST53). The main control section 11 checks a list of the branches of the selected bank and causes the unit 5 to display a message, "PLS SELECT BRANCH," and keys for selecting a branch (ST54). The customer touches some of these keys, thus entering the name of the desired branch (ST55). The section 11 detects this fact causes the CRT display unit 5 to display a message, "PLS INPUT ITEM AND ACCOUNT NO.," the ten keys, the correction key, and checking key (ST56). The customer enters the account number and the item number (ST57). When the section 11 detects that the customer has not selected the main office of the bank in step ST55, it causes the unit 5 to display a message, "PLS INPUT TRANSFEREE," the katakana keys, the correction key, and the end key (ST58). When the customer touches the end key in step ST59, or when the main control section 11 detects that the customer has selected the main office in step ST55, the section 11 causes the CRT display unit 5 to display a message, "PLS INPUT TRANSFERER," the katakana keys, and the end key (ST60). The customer enters the transferer's name (ST61). The section 11 detects this and causes the unit 5 to display a message, "PLS INPUT PHONE NO. OF TRANSFERER," the ten keys, and the end key (ST62). Accordingly, the customer inputs the transferer's phone number and touches the end key (ST63). The section 11 then causes the CRT display unit 5 to display a message, "IN OPERATION" (ST64). When the section 11 receives the electronic funds-transfer information from the host computer, it causes the printing unit 76 to print this information on the journal paper 59. It then causes the CRT display unit 5 to display a message, "PLEASE CONFIRM," the transfer information, the confirmation key, and the cancellation key (ST56). The customer touches the confirmation key or the cancellation key (ST66). When the main control section 11 detects that he has touched the cancellation key, it starts the cancellation process. When it detects that the confirmation key has been touched, it causes the unit 5 to display a message, "PLS INSERT NOTES AND COINS," the confirmation key, and cancellation key (ST67). The customer inserts notes in the bank note port 3 and coins in the coin-inserting port 8 (ST68). The notes are supplied to the note teller 14, discriminated and counted. When the note teller 14 finishes discriminating and counting the notes, the main control section 11 causes the unit 5 to display the amount of cash supplied to the note teller 14 (ST69). The customer touches the confirmation key when the displayed amount is correct, or touches the cancellation key when this amount is incorrect (ST70). When the section 11 detects that the cancellation key has been touched, it starts the cancelling process. On the other hand, when it detects that the confirmation key has been selected, it causes the CRT display unit 5 to display a message, "IN OPERATION" (ST71). When the section 11 receives the electronic funds-transfer information from the host computer, it causes the printing unit 76 to print this information on the journal paper 59. The section 11 compares the amount to transfer with the amount withdrawn from the account or with the amount of cash inserted by the customer, thus determining whether change must be dispensed. When the section 11 detects that change should be dispensed, it causes the CRT display unit 5 to display a message, "PLS RECEIVE CHANGE" (ST72). The section 11 causes the note teller 14 to dispense the note change from the bank note port 3 and the coin change from the coin-inserting port 9. The customer takes the notes and coins (ST73). When the section 11 detects that no change is left untaken, it starts the transfer card error operation (ST73A) and causes the unit 5 to display a question, "TRANSFER CARD REQUIRED?," the "YES" key, and the "NO" key (ST74). When the customer touches the "YES" key in step ST75, the main control section 111 causes the printing/reading section 13 to print the transfer information, i.e., the name of the bank, name of the branch, account number, type of the transferee's account, transferer's name, and transferer's phone number on a new transfer card 10 (FIG. 4). The transfer information is recorded by the magnetic head 50 on the magnetic strip 32 of the new card 10. This card 10 is dispensed from the passbook/card port 7. The main control section 11 causes the CRT display unit 5 to display a message, "PLS RECEIVE TRANSFER CARD" (ST76). When the customer takes the transfer card 10 in step ST77, or he touches the "NO" key in step ST78, the section 11 causes the CRT display unit 5 to display a message, "PLS RECEIVE CARD AND RECEIPT" (ST79). The customer takes the card and receipt (ST80). Here, the automatic-transfer-transaction process is completed.

Suppose the customer touches the key for "CARD OPERAION" in step ST50, seeing the message, "PLS SELECT KEY OR CARD OPERATION," and then inserts his transfer card 10 in the passbook/card port 7 (ST81). The card 10 is conveyed to the printing/reading section 13. The section 11 starts the transfer card operation (later described) in step ST81A. It is then determined whether or not the transfer information read from the card 10 contains an error (ST81B). When the answer to this question is "yes," the operation goes to step ST51. When the answer is "no," the transfer data, i.e., the initial and code of the finantial institution with the transferee's account, the initial and code of the branch of the destination institution, the transferee's account type, the transferee's account number, the transferer's name, the valid period of the transfer card 10, the number of uses, etc., is supplied to the main control section 11. The section 11 causes the CRT display unit 5 to display a message, "IN OPERATION" (ST82). The section 11 receives the electronic funds-transfer information from the host computer and causes the printing unit 76 to print this information on the journal paper 59. Thereafter, it causes the unit 5 to display a message, "PLS CONFIRM," the transfer information, the confirmation key, and the cancellation key (ST83). The customer touches the confirmation key or the cancellation key (ST84). When the section 11 detects that the customer has touched the cancellation key, it starts the cancelling process. When it detects that the customer has touched the confirmation key in step ST84, it causes the CRT display unit 5 to display a message, "PLS INSERT NOTES AND COINS," the confirmation key, and the cancellation key (ST85). The customer inserts the notes in the bank note port 3 and coins in the coin-inserting port 8 (ST86). The notes are supplied to the note teller 14, discriminated and counted. The main control section 11 causes the unit 5 to display the amount of cash inserted (ST87). The customer touches the confirmation key or the cancellation key (ST88). When the section 11 detects that he has touched the cancellation key in step ST88, it starts the cancelling operation. When it detects that the confirmation key has been touched in step ST88, it causes the CRT display unit 5 to display a message, "IN OPERATION" (ST89). When the section 11 receives the electronic funds-transfer information from the host computer, it causes the printing unit 76 to print this information on the journal paper 59. The main control section 11 compares the amount to transfer with the withdrawn amount or with the inserted amount, thus determining whether or not change should be given. When the answer is "yes," the section 11 causes the CRT display unit 5 to display a message, "PLS RECEIVE CHANGE," and the amount of change (ST90). In this case, the section 11 causes the note teller 14 to dispense the notes and/or coins through the ports 3 and 9, and the customer takes the change (ST91). When the section 11 detects that no change is left untaken, it causes the CRT display unit 5 to display a message, "PLS RECEIVE TRANSFER CARD" (ST92). The customer takes the transfer card 10 (ST93). The main control section 11 then causes the CRT display unit 5 to display a message, "PLS RECEIVE CARD AND RECEIPT" (ST94). The customer takes the ID card and the receipt (ST95). Here ends the automatic-transfer transaction process (ST95).

As described above, to transfer money to the same account for the second time by using the transfer card, the customer need only insert the transfer card 10, enter the transfer amount, insert cash, if necessary, and touch the confirmation key a few times. He does not need to enter the other transfer information, i.e., the name of the bank with the transferee's account, the type of bank, the name of the destination branch, the item code specifying the type of the transferee's account, transferee's account number, transferee's name, transferer's name, transferee's and transferer's telephone numbers, etc. The customer can save much time.

Figure 9:
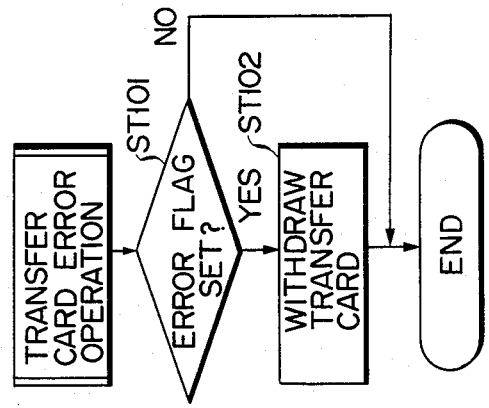

With reference to FIG. 9, the transfer card error operation will be explained. First, the main control section 11 determines in step ST101 whether or not a card error flag has been set in an internal memory (not shown). When the answer to this question is "no," the transfer card error operation ends. When the answer is "yes," it is considered impossible to read the transfer information from the transfer card 10. In this case, the card 10 is withdrawn to the box 68 (ST102). Here, the transfer card error operation ends.

Figure 10:
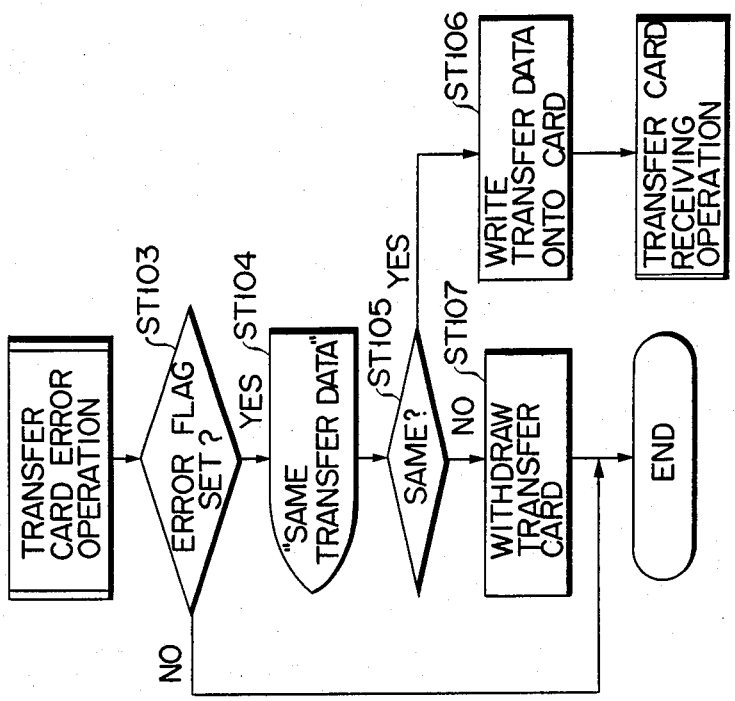
FIGS. 9 and 10 are flow charts illustrating how to withdraw a transfer card.

The transfer card error operation may also be carried out as illustrated in the flow chart of FIG. 10. The section 11 determines in step ST103 whether or not a card error flag has been set in an internal memory (not shown). When the answer to this question is "no," the transfer card error operation ends. When the answer is "yes," the section 11 causes the CRT display unit 5 to display a question, "SAME TRANSFER DATA?," the "SAME" key, and the "NOT SAME" key (ST104). The customer touches the "SAME" key or the "NOT SAME" key (ST105). When the section 11 detects that the "SAME" key has been touched in step ST105, it causes the magnetic head 50 to record the transfer data on the magnetic strip 32 of the transfer card 10 (ST106). Thereafter, the transfer card receiving operation is performed. When the section 11 detects in step ST105 that the customer has touched the "NOT SAME" key, it is considered impossible to read the transfer data from the transfer card 10. Hence, the card 10 is withdrawn to the box 68 (ST107), and the transfer card error operation ends.

Figure 11:
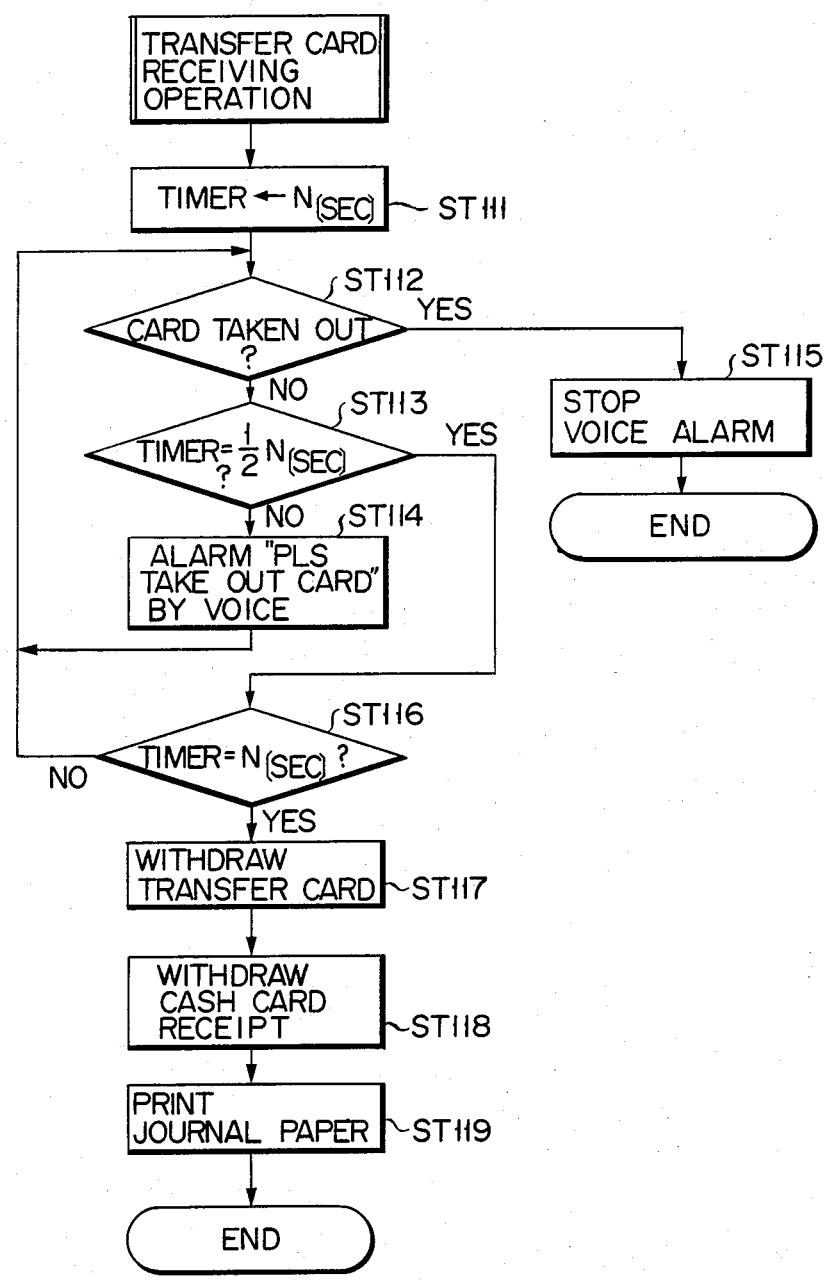
FIG. 11 is a flow chart showing how to receive a transfer card.

The transfer card receiving operation is performed in the manner shown in the flow chart of FIG. 11. The main control section 11 sets a timer (not shown) to a count of N seconds (ST111). It determines whether or not the transfer card has been withdrawn from the machine (ST112). If the answer is "no," it is then determined whether or not the count of the timer has reached the value of N/2 (ST113). When the answer is "no," the section 11 causes the audio instruction unit 17 to give a message, "PLS TAKE OUT CARD" (ST114). On the other hand, when the answer to the question asked in step ST112 is "yes," the section 11 stops this audio message (ST115), whereby the transfer card receiving operation ends. When the answer to the question imposed in step ST113 is "yes," the section 11 determines whether or not the timer has reached the set value N (ST116). When the answer is "no," the operation returns to step ST112. When the answer is "yes," the section detects that the transfer card 10 has not been taken out and supplies the card 10 to the box 68 (ST117). The main control section 11 withdraws the ID card and the receipt, too (ST118). It causes the print head 56 to print this fact on the journal paper 56 (ST119). Here, the transfer card receiving operation comes to an end. The information printed on the paper 76 includes the amount of cash the customer has inserted and the data showing whether or not a transfer card, an ID card and a passbook are available for the customer.

Figure 12:
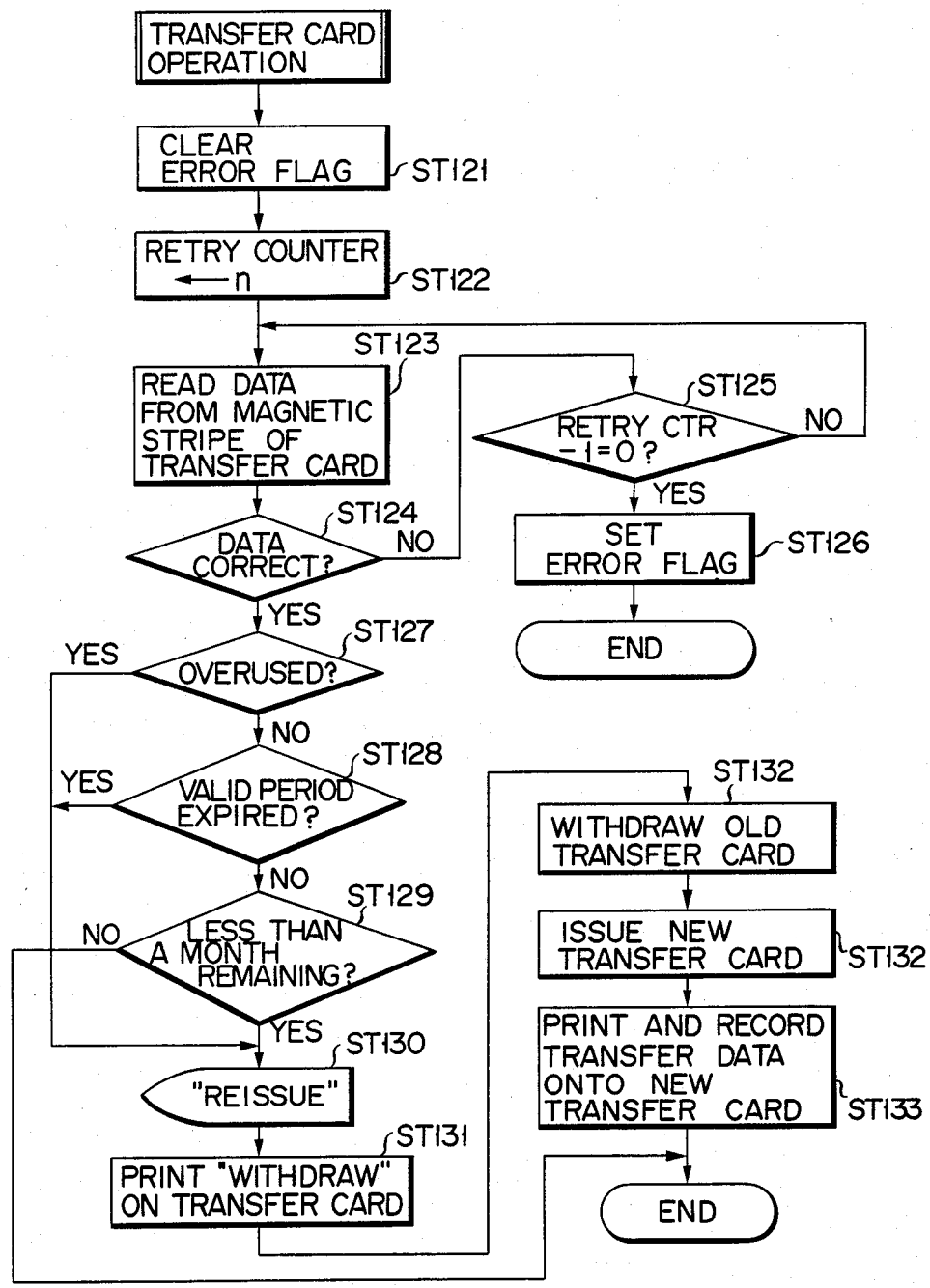
FIG. 12 is a flow chart explaining how to process a transfer card.

The transfer card operation is performed as shown in FIG. 12. First, the main control section 11 clears the transfer card error flag in the internal memory (not shown) in step ST121. Then it set a count n in a retry counter (not shown) in step ST122. The section 11 causes the magnetic head 50 to read the data from the magnetic strip 32 of the transfer card 10 (ST123). This information is checked (ST124). When this data is incorrect, the section 11 reduces the count of the tetry-counter by one (ST125). It determines whether or not the count of this counter is zero (ST126). When the answer is "no," the operation returns to step 123. When the answer is "yes," the section 11 sets a transfer card error flag in the internal memory, thereby completing the transfer card error operation (ST126). When the section 11 detects in step ST124 that the data is correct, it adds one to the data representing the number of times used, i.e., a piece of data included in the data read from the transfer card 10, and determines whether or not the card 10 has been overused (ST127). When the answer is "no," the section 11 determines whether or not the valid period of the card 10 has expired (ST128). When the answer to this question is "no," the section 11 determines whether or not the valid period will expire within one month (ST129). When the answer to the question asked in step ST127, the answer to the question imposed in step ST128, or the answer to the question asked in step ST129 is "yes," the section 11 causes the CRT display unit 5 to display a message, "IN OPERATION TO REISSUE TRANSFER CARD. PLS WAIT" (ST130). It causes the print head 56 to print "VALID PERIOD EXPIRED, AND WITHDRAWN" on the transfer card 10 as shown in FIG. 14 (ST131). These words are printed in red and in large characters to help anyone to quickly understand that the card is no longer valid. The section 11 supplies the old card 10 to the box 68 (ST132). It then causes the printing section 13 to print the pieces of data as shown in FIG. 3 on the new transfer card 10, causes the magnetic head 50 to record these pieces of data and other data on the magnetic strip 32 of the new card 10, and issues the new card 10 through the passbook/card port 7 (ST133).

More specifically, the new card 10 is taken out of the box 69 by the take-out roller 70 and conveyed along the path 44 in the direction of arrow a. When its trailing edge reaches the printing head 56, the card 10 is then moved in the direction of arrow b. As the card 10 is moved in this direction, the head 56 prints the transfer data on the new card 10. Thereafter, the card 10 is conveyed in the direction of arrow a until its magnetic strip 32 reaches the magnetic head 50. The head 50 records the transfer information on the strip 32. The card 10 is then tested to see if the data can be magnetically read. When it is found the data can be so read from the card 10, the card is issued through the passbook/card port 7.

When the section 11 detects in step ST129 that the remaining period of the transfer card 10 is longer than one month, it completes the transfer card operation.

As mentioned above, even if the data cannot be read from the magnetic strip 32 of the transfer card 10, the transfer transaction process need not be repeated from the beginning; the process can be started by entering the transfer information. Hence, the customer can save much time.

As described above in detail, the present invention can provide an automatic-transfer-transaction processing apparatus which may easily be operated by anyone and which may therefore accomplish a transfer transaction at at high speed.

What is claimed is:

1. An automatic-transfer-transaction processing apparatus comprising:
   first means for receiving a transfer card on which at least the transferee and the limit data of the card are recorded and from which these pieces of data can be read by a device, and for reading these pieces of data;
   second means for transferring a specified amount to the transferee which has been read from the card;
   third means for determining, from the limit data, whether or not a new transfer card must be issued; and
   fourth means for issuing a new card in accordance with the decision made by the third means.

2. An apparatus according to claim 1, wherein said second means includes auxiliary input means for inputting the transferee, so as to transfer the specified amount to the transferee when it is impossible to read the transferee from the transfer card.

3. An apparatus according to claim 1, wherein said second means transfers a specified amount of cash inserted in the apparatus or a specified amount from an account specified by an ID card, may compare the balance of the account with any specified amount to be transferred and transfers the specified amount only when the balance of the specified account is greater than the specified amount, and in case the balance is less than the specified amount, said second means instructs the user to insert cash to make up for the difference between the balance and the specified amount.

4. An apparatus according to claim 1, further comprising a fifth means for withdrawing the transfer card in accordance with the decision made by said third means.

5. An apparatus according to claim 4, wherein said fourth means prints on a withdrawn transfer card the data showing that the card can no longer be used.

6. An apparatus according to claim 1, wherein said limit data represents the valid period of the transfer card, and said third means is a device for comparing the present date with the expiration date of the card.

7. An apparatus according to claim 1, wherein said third means determines that a new transfer card must be issued when the valid period of the transfer card will expire within one month.

8. An apparatus according to claim 1, wherein the transferee and the limit data are recorded on the magnetic strip of the transfer card.

9. An apparatus according to claim 1, wherein said transfer card is made of paper.

10. An apparatus according to claim 1, wherein said limit data is the number of times that the transfer card may further be used, and said third means compares this number of times with a predetermined number of times and determines that a new transfer card must be issued when the transfer card has been used more times than the predetermined number of times.

* * * * *